7322X

J. A. Bradshaw.

Throstle and Cap.

Patented Dec. 8, 1832.

N. PETERS, PHOTO-LITHOGRAPHER, WASHINGTON, D. C.

7322X                                Dec. 8. 1832

John A. Bradshaw, of Foxborough, Mass:
Letters Patent.

The schedule referred to in these Letters Patent and making part of the
same containing a description in the words of the said John A. Bradshaw
himself of his improvement in the machine for manufacturing cotton roving.

---

Figure 1:
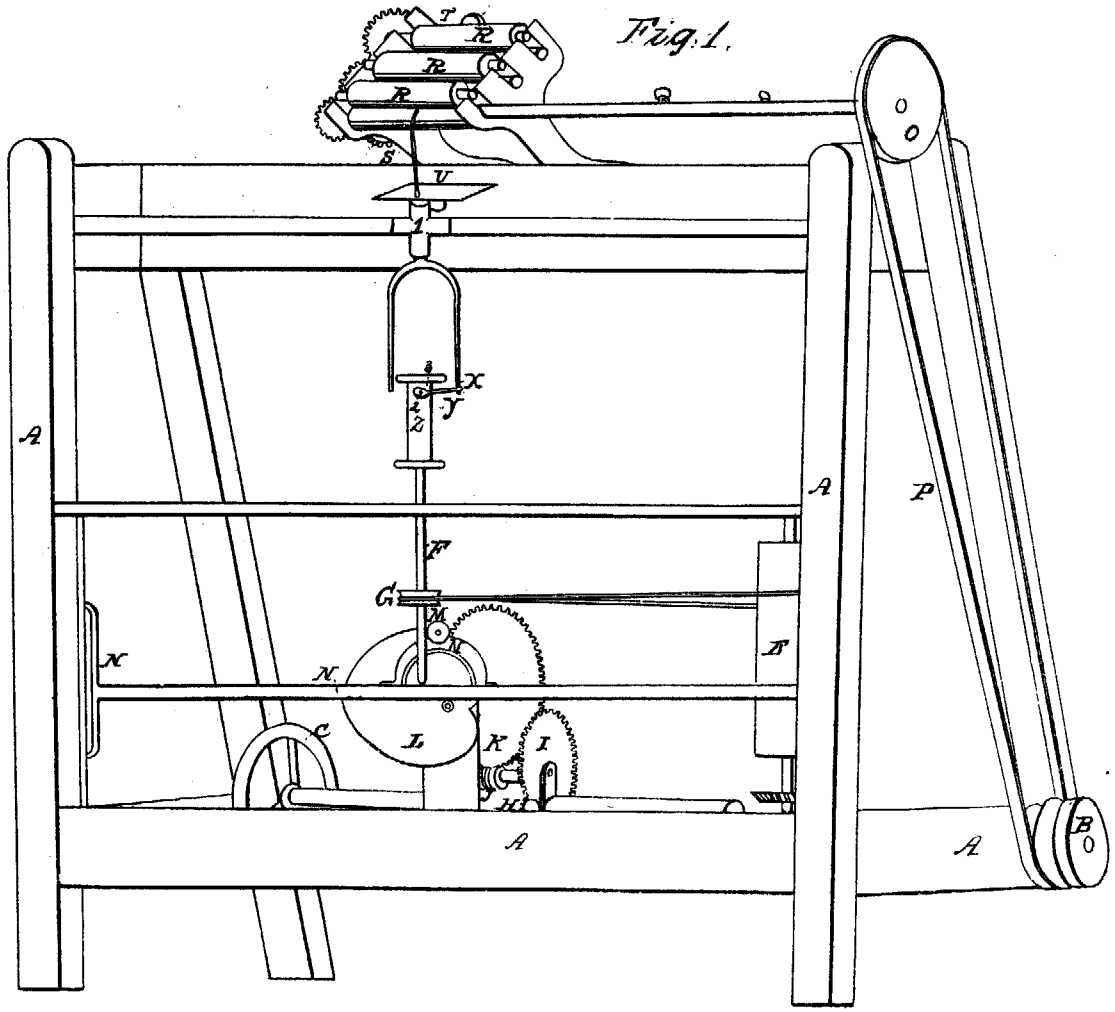
Figure 2:
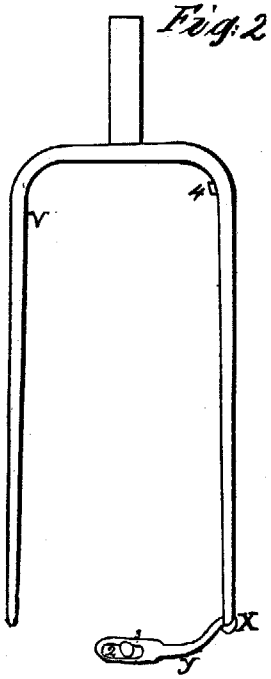

To all to whom these presents shall come: Be it known that I. John A.
Bradshaw of Foxborough in the county of Norfolk & Commonwealth of Massa-
chusetts have invented a new & useful improvement in a machine for the
manufacturing cotton roving. & that the following is a full & exact description
of the construction & operation of the said machine as invented or improved
by me _ A.A &c. Fig. 1. represents the frame of the said machine _
B. is a pulley on the main horizontal shaft (concealed in the drawing) connec-
ted by a belt with the propelling power, on the end of said shaft is a gear-
ing which moves the balance wheel C. on the said main shaft is a drum
also concealed as aforesaid connected by a belt with the drum D. on the
shaft in front.. On the end of this shaft is a bevel gearing that moves the
vertical drum E. said drum moves the spindle F. by a belt passing round
the pulley G. on said spindle _ On the other end of the front shaft is the
pinion H. which gears into & moves the wheel I on the shaft of which is the
worm J which moves the wheel K. on the end of which shaft, is the heart
~~wheel L. which plays against the stud wheel M. which~~ gives a vertical mo-
tion to the spindle by means of the traverse N.N.N.N. _ O. is a pulley connected
~~by a belt P. with the main shaft first mentioned~~ _
This pulley is on the end of the horizontal shaft Q on the other end of which
is a pinion geared into a stud wheel S which so moves the rollers R.R.R. as
to give a progressive increase of velocity _ Behind said rollers is the guide
T. thro' which passes the cotton drawing as taken from the drawing frames _
The cotton after passing between said rollers enters the friction guide U. to which
is attached a weight, it then enters the flier V thence passing thro' the guide
W down one of its arms & thro' the guide X at the bottom, thence passing
along the curved spring Y around a crook or projection Z thence thro' the

7322X perforation o near the end of said spring, thence around the bobbin Z. which
is fixed on the spindle & revolves with the same. The flier revolves on its
bearing at 1. & is moved by the strength of the roving as it passes thro' the perfo.
ration in the spring - Fig. 11. is an enlarged representation of said flier & spring
with its crook or projection & perforation, in which consists the new improve.
ment & which spring &c. may be applied to a flier of any other form -
Its use is to give a slight degree of twist & greater consistency to the roving -

Witnesses
Melatiah Everett
Nancy S. Everett

John A. Bradshaw

[illegible] 5701080